(12) United States Patent
Takeda (10) Patent No.: US 10,422,310 B2
(45) Date of Patent: Sep. 24, 2019

(54) IGNITION DEVICE (71) Applicant: DENSO CORPORATION, Kariya, Aichi-pref. (JP)

(72) Inventor: Shunichi Takeda, Kariya (JP)

(73) Assignee: DENSO CORPORATION, Kariya (JP)

( * ) Notice: Subject to any disclaimer, the term of this patent is extended or adjusted under 35 U.S.C. 154(b) by 30 days.

(21) Appl. No.: 15/749,555

(22) PCT Filed: Jul. 15, 2016

(86) PCT No.: PCT/JP2016/070949
§ 371 (c)(1),
(2) Date: Feb. 1, 2018

(87) PCT Pub. No.: WO2017/026227
PCT Pub. Date: Feb. 16, 2017

(65) Prior Publication Data
US 2018/0223790 A1 Aug. 9, 2018

(30) Foreign Application Priority Data

Aug. 7, 2015 (JP) .................................. 2015-157618

(51) Int. Cl.
| F02P 3/00 | (2006.01) |
| F02P 3/055 | (2006.01) |
| F02P 7/03 | (2006.01) |
| F02P 17/12 | (2006.01) |
| H01F 38/12 | (2006.01) |
(Continued)

(52) U.S. Cl.
CPC ................. *F02P 3/055* (2013.01); *F02P 3/00* (2013.01); *F02P 3/0892* (2013.01); *F02P 5/1502* (2013.01); *F02P 7/03* (2013.01); *F02P 17/12* (2013.01); *H01F 38/12* (2013.01);
(Continued)

(58) Field of Classification Search
CPC .. F02P 3/00; F02P 3/055; F02P 3/0892; F02P 5/1502; F02P 7/03; F02P 17/12; F02P 3/0442; F02P 9/005; F02P 9/007; F02P 15/10; H01F 38/12
See application file for complete search history.

(56) References Cited

U.S. PATENT DOCUMENTS

| 6,112,730 A | 9/2000 | Marrs et al. |
| 6,135,099 A | 10/2000 | Marrs et al. |
(Continued)

FOREIGN PATENT DOCUMENTS

| JP | 62-233476 | 10/1987 |
| JP | 2012-004238 | 1/2012 |
(Continued)

*Primary Examiner* — Hieu T Vo
(74) *Attorney, Agent, or Firm* — Nixon & Vanderhye P.C.

(57) ABSTRACT

The return circuit of the ignition device returns to the battery the current supplied to the primary coil by the operation of the second circuit, and the voltage detection unit detects the voltage VB. The operation stopping unit monitors the voltage VB and when it is determined that the voltage VB is excessive, that is, when the voltage VB exceeds the threshold voltage VBc, it stops the supply of energy by the second circuit. As a result, when a load dump state occurs, the supply of energy by the second circuit can be stopped. Thus, when a load dump state occurs by the operation of the second circuit, other devices can be protected from overvoltage.

5 Claims, 6 Drawing Sheets (51) Int. Cl.
    *F02P 3/08*     (2006.01)
    *F02P 5/15*     (2006.01)
    F02P 15/10     (2006.01)
    F02P 3/04     (2006.01)
    F02P 9/00     (2006.01)

(52) U.S. Cl.
    CPC ............ *F02P 3/0442* (2013.01); *F02P 9/005* (2013.01); *F02P 9/007* (2013.01); *F02P 15/10* (2013.01)

(56) References Cited

U.S. PATENT DOCUMENTS 9,903,333 B2 *   2/2018   Terada ..................... F02P 3/08
2016/0084213 A1   3/2016   Nakayama et al.

FOREIGN PATENT DOCUMENTS

| JP | 5412353 | 2/2014 |
| JP | 2015-014237 | 1/2015 |
| JP | 2015-200274 | 11/2015 |

\* cited by examiner

IGNITION DEVICE

This application is the U.S. national phase of International Application No. PCT/JP2016/070949 filed 15 Jul. 2016, which designated the U.S. and claims priority to JP Patent Application No. 2015-157618 filed 7 Aug. 2015, the entire contents of each of which are hereby incorporated by reference.

TECHNICAL FIELD

The present disclosure relates to an ignition device for an internal combustion engine.

BACKGROUND ART

A conventionally known ignition device contains an ignition coil including a primary coil and a secondary coil, and an ignition plug connected to the secondary coil. The energization of the primary coil is turned on/off to cause electromagnetic induction to supply energy to the ignition plug, and thereby spark discharge is generated. Further, as a means for continuing a spark discharge once generated, there is known an ignition device as follows including first and second circuits.

The first circuit is a conventionally well-known ignition circuit for starting spark discharge at an ignition plug by turning on/off the energization of the primary coil. For example, the first circuit is configured by connecting the (+) pole of the battery with the (+) terminal of the primary coil, the (−) terminal of the primary coil with the ground, and placing a switch for starting discharge on the (−) side of the primary coil.

Further, the second circuit is for continuing the spark discharge started by the operation of the first circuit, and during the spark discharge started by the operation of the first circuit, it energizes the primary coil in a direction opposite to that of the first circuit. The second circuit maintains the energization of the secondary coil in the same direction as that initiated in the operation of the first circuit to continue supplying energy to the ignition plug, so that the spark discharge continues. Further, for example, the second circuit is configured by being connected between the primary coil and the ignition switch with respect to the first circuit, and providing a switch for turning on/off the power supply from the boost circuit to the primary coil (see, for example, PTL 1).

It is stated that if the electric energy of the boost circuit is supplied from the (−) side of the primary coil by turning on/off the second switch to continue the spark discharge in such configuration, it is possible to continue spark discharge while reducing the burden on the ignition plug and also reducing unnecessary power consumption.

Meanwhile, when a battery is used as the destination of the return flow of the current supplied to the primary coil by the operation of the second circuit, a problem as follows may arise that overvoltage may be applied to other devices. That is, when a battery is adopted as the destination of the return flow, a return circuit for allowing the current supplied to the primary coil to flow to the battery is provided in the ignition device together with the first and second circuits. In such an ignition device, when the so-called load dump state, a state where the connection between the return circuit and the battery is broken due to bad connection, detachment of the battery terminal, or the like, occurs, if the supply of energy by the second circuit is continued, the voltage of the return circuit rises and overvoltage may be applied to other devices connected to the return circuit.

PTL 2 discloses the following configuration in relation to an ignition device for an internal combustion engine having a first circuit and a boost circuit. That is, according to the ignition device of PTL 2, the waveform of the voltage supplied from the battery to the ignition device is monitored, and whether there is an abnormality in the regulator of the alternator or the battery is determined based on this waveform. When it is determined that there is an abnormality, the power supply to the ignition device is stopped, and when it is determined that there is no abnormality, the power supply to the ignition device is resumed.

Thus, according to the ignition device of PTL 2, the ignition device is protected from the overvoltage during the period from occurrence of the abnormality to return to the normal voltage, and when the voltage has returned normal, the ignition device can immediately operate normally without manual recovery work or the like on the control. In addition, according to such configuration, even if a load dump state occurs, the ignition device can be protected from overvoltage.

However, in a case where the ignition device includes a second circuit and the destination of the return flow is a battery, as a countermeasure against the occurrence of the load dump state, it is necessary to consider protection of other devices besides protection of the ignition device itself. The ignition device of PTL 2 does not consider protection of other devices.

CITATION LIST

Patent Literature

[PTL 1] JP 2014-206068 A
[PTL 2] JP 5412353 B

SUMMARY OF THE INVENTION

Technical Problem

The present disclosure has been devised in view of the above problem, and an object of the present disclosure is to configure an ignition device for an internal combustion engine which employs a battery as a destination of the return flow of the current supplied to a primary coil by the operation of a second circuit such that other devices are protected from overvoltage when a load dump state occurs.

Solution to Problem

The ignition device of the present disclosure is used in an internal combustion engine, and contains an ignition coil including a primary coil and a secondary coil, and an ignition plug connected to the secondary coil. The energization of the primary coil is turned on/off to cause electromagnetic induction to supply energy to the ignition plug, and thereby spark discharge is generated. This ignition device includes the following first circuit, second circuit, return circuit, voltage detection unit, and operation stopping unit.

First, the first circuit causes the ignition plug to start spark discharge by turning on/off the energization of the primary coil. Next, the second circuit energizes the primary coil in a direction opposite to that by the first circuit during the spark discharge started by the operation of the first circuit, to maintain the energization of the secondary coil in the same direction as that started in the operation of the first circuit and continue supplying energy to the ignition plug, thereby allowing the spark discharge to continue.

Further, the return circuit returns to the battery the current supplied to the primary coil by the operation of the second circuit. The voltage detection unit is connected to the battery side of the primary coil and detects the voltage of the battery side of the primary coil. The operation stopping unit monitors the voltage of the battery side, and when it is determined that the voltage of the battery side is excessive, stops the supply of energy by the second circuit.

As a result, when a load dump state occurs, the supply of energy by the second circuit can be stopped. Thus, when a load dump state occurs in an ignition device which employs a battery as the destination of the return flow of the current supplied to the primary coil by the operation of the second circuit, other devices can be protected from overvoltage.

DESCRIPTION OF THE EMBODIMENTS

An embodiment for carrying out the technique of the present disclosure will be described by way of an Example below. It is to be understood that the Example merely disclose a specific example and the technique of the present disclosure is not limited to it.

EXAMPLE

Configuration of Example

Figure 1:
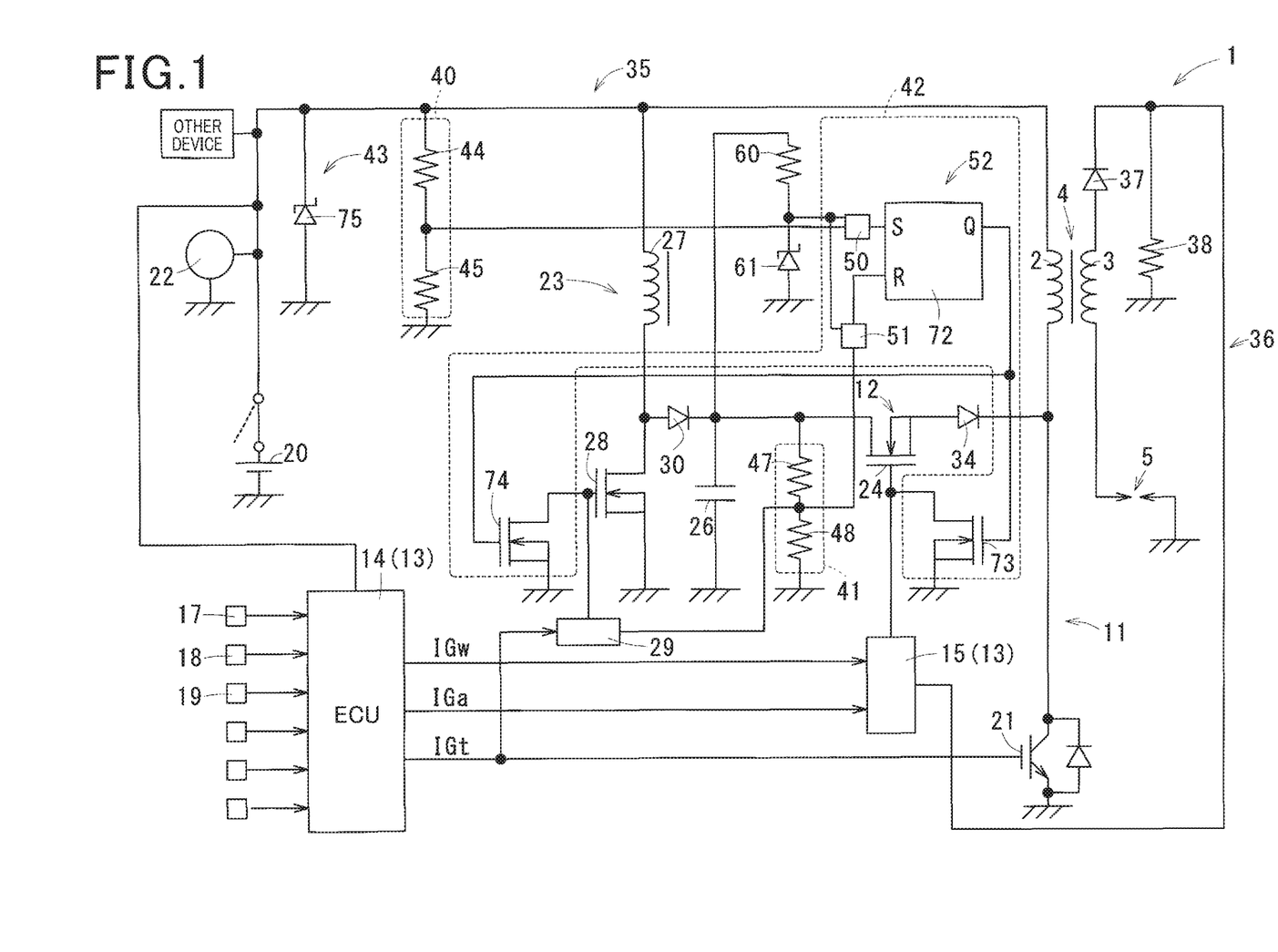
FIG. 1 is a configuration diagram of an ignition device according to an Example of the present disclosure.
Figure 2:
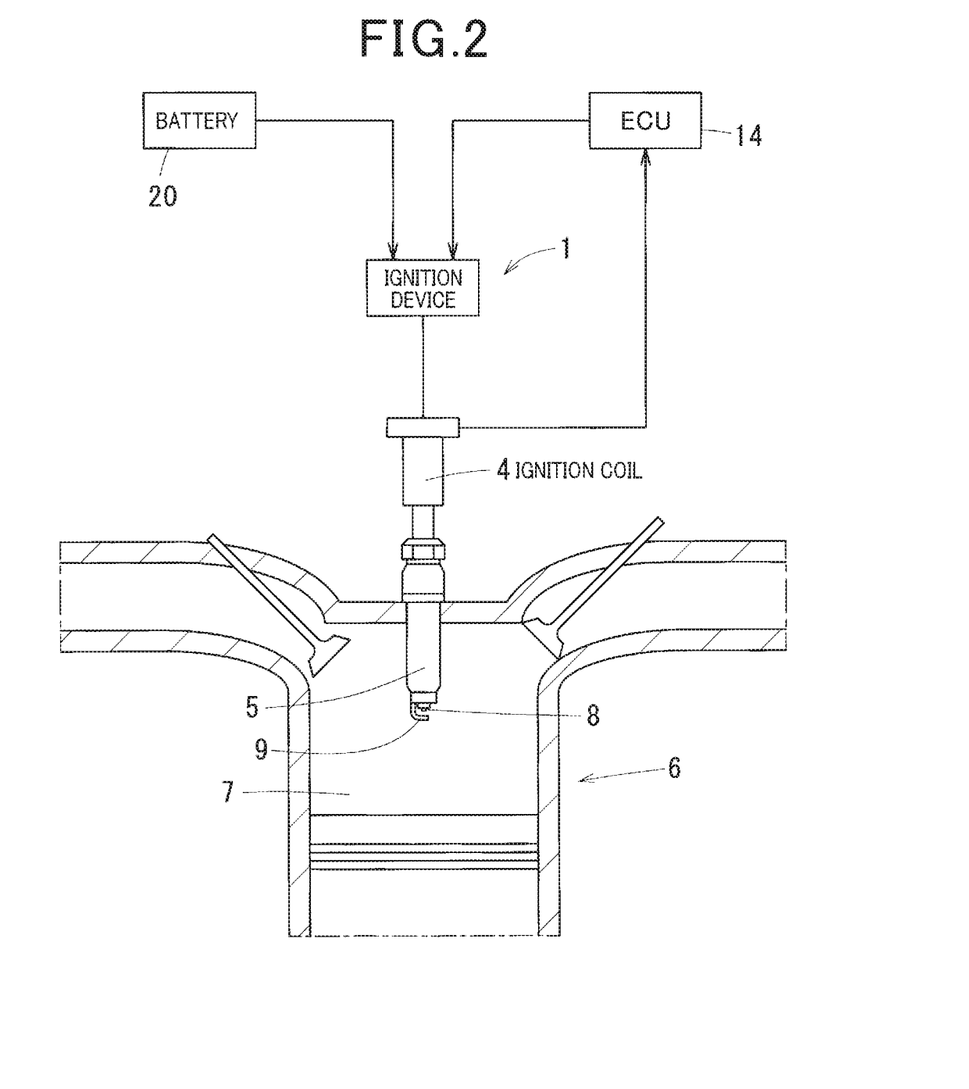
FIG. 2 is a configuration diagram of an internal combustion engine including the ignition device according to the Example of the present disclosure.

The configuration of the ignition device 1 according to the Example of the present disclosure will be described with reference to FIGS. 1 and 2. The ignition device 1 contains an ignition coil 4 including a primary coil 2 and a secondary coil 3, and an ignition plug 5 connected to the secondary coil 3. The energization of the primary coil 2 is turned on/off to cause electromagnetic induction to supply energy to the ignition plug 5, and thereby spark discharge is generated. The ignition device 1 is to be mounted on an internal combustion engine 6 for vehicle driving, and ignites an air-fuel mixture in a cylinder 7 at a certain ignition timing.

The ignition plug 5 has a well-known structure, and includes a center electrode 8 connected to one end of the secondary coil 3 and a ground electrode 9 grounded via a cylinder head of the internal combustion engine 6 or the like.

Spark discharge is generated between the center electrode 8 and the ground electrode 9 by the energy generated at the secondary coil 3.

Further, the internal combustion engine 6 is, for example, a direct injection type capable of lean burn using gasoline as the fuel, and is configured such that a rotational flow of the air-fuel mixture such as a tumble flow or a swirl flow is generated in the cylinder 7. Next, the ignition device 1 will be described in detail.

The ignition device 1 includes first and second circuits 11 and 12 and a control unit 13. The first circuit 11 is configured to cause the ignition plug 5 to start spark discharge by turning on/off the energization of the primary coil 2. The second circuit 12 energizes the primary coil 2 in a direction opposite to that by the first circuit 11 during the spark discharge started by the operation of the first circuit 11, to maintain the energization of the secondary coil 3 in the same direction as that started in the operation of the first circuit 11 and continue supplying energy to the ignition plug 5, thereby allowing the spark discharge to continue.

The control unit 13 is a part for controlling the operation of the first and second circuits 11, 12, and includes an electronic control unit (hereinafter referred to as ECU 14), an energization driver 15, and the like.

The ECU 14 constitutes the central part of the control over the internal combustion engine 6, and outputs various signals such as an ignition signal IGt and a discharge continuation signal IGw, which will be described later, to control energization of the primary coil 2, controls the electric energy induced in the secondary coil 3 thorough the control of the energization of the primary coil 2, and controls the spark discharge of the ignition plug 5.

The ECU 14 receives signals from various sensors mounted on the vehicle to detect parameters indicating the operational state and control state of the internal combustion engine 6. The ECU 14 includes an input circuit for processing input signals, a CPU for performing control processing and calculation processing relating to the control of the internal combustion engine 6 based on the input signals, various memories for storing data, programs, and the like needed for the control of the internal combustion engine 6, an output circuit for outputting signals needed for the control of the internal combustion engine 6 based on the processing results of the CPU, and the like.

The various sensors outputting signals to the ECU 14 may include, for example, a rotation speed sensor 17 for detecting the rotation speed of the internal combustion engine 6, an intake pressure sensor 18 for detecting the pressure of the intake air taken into the internal combustion engine 6, and an air-fuel ratio sensor 19 for detecting the air-fuel ratio of the air-fuel mixture.

The ECU 14 executes ignition control and fuel injection control in the internal combustion engine 6 based on the detected values of the parameters obtained from these sensors.

The first circuit 11 is configured by connecting the (+) pole of the battery 20 with one terminal of the primary coil 2, the other terminal of the primary coil 2 with the ground, and placing a switch (hereinafter referred to as first switch 21) for starting discharge on the ground side (lower electric potential side) of the other terminal of the primary coil 2.

The battery 20 is connected with an alternator 22, and is charged when the alternator 22 is driven.

The alternator 22 is driven by the internal combustion engine 6 and generates electric power. The alternator 22 is connected between the battery 20 and the primary coil 2 of the first circuit 11.

Between the alternator 22 and the primary coil 2, various other devices such as the ECU 14 which operate by receiving electric power from the battery 20 are connected.

The capacity of the battery 20 is sufficiently large, and the fluctuation of voltage due to charging and discharging is small.

The first circuit 11 allows the primary coil 2 to store energy by turning on/off the first switch 21, and generates high voltage at the secondary coil 3 using the energy stored in the primary coil 2, to cause the ignition plug 5 to start the spark discharge.

Hereinafter, the spark discharge generated by the operation of the first circuit 11 may also be referred to as main ignition. With regard to the energization direction of the primary coil 2 (that is, the direction of the primary current), the direction from the battery 20 to the first switch 21 is positive here.

More specifically, the first circuit 11 turns on the first switch 21 in a period during which the ignition signal IGt is sent as a high signal from the ECU 14, so that the voltage of the battery 20 is applied to the primary coil 2 and a positive primary current is provided, and the primary coil 2 stores magnetic energy. After that, the first circuit 11 turns off the first switch 21 so that high voltage is generated in the secondary coil 3 by electromagnetic induction and main ignition occurs.

The first switch 21 may be an IGBT, a MOS transistor, a thyristor, or the like. The ignition signal IGt is a signal for instructing the period in which the primary coil 2 stores energy in the first circuit 11 and the ignition start timing.

The second circuit 12 is configured by being connected between the primary coil 2 and the first switch 21 in the first circuit 11, and providing a switch (hereinafter referred to as second switch 24) for turning on/off the power supply from the boost circuit 23 to the primary coil 2. The boost circuit 23 boosts the voltage of the battery 20 and stores it in the capacitor 26 in a period during which the ignition signal IGt is supplied from the ECU 14.

More specifically, the boost circuit 23 includes the capacitor 26, a choke coil 27, a boost switch 28, a boost driver 29, and a diode 30.

One end of the choke coil 27 is connected to the (+) pole of the battery 20, and the energization state of the choke coil 27 is interrupted by the boost switch 28. The boost driver 29 supplies a control signal to the boost switch 28 to turn on/off the boost switch 28. The boost switch 28 may be a MOS transistor or the like. The capacitor 26 stores as electrical energy the magnetic energy generated in the choke coil 27 by the on/off operation of the boost switch 28.

The boost driver 29 is provided so that it repeatedly turns on/off the boost switch 28 at a certain cycle during a period in which the ignition signal IGt is supplied from the ECU 14. The diode 30 prevents the energy stored in the capacitor 26 flowing back to the choke coil 27 side.

The second circuit 12 includes the second switch 24 and a diode 34.

The second switch 24 is, for example, a MOS transistor which turns on/off the supplying of energy to be stored in the capacitor 26 from the negative side of the primary coil 2.

The diode 34 prevents reversing of the current from the primary coil 2 to the second switch 24 side.

The second switch 24 is turned on by a control signal supplied from the energization driver 15, and provides energy from the boost circuit 23 to the negative side of the primary coil 2.

In a period during which a discharge continuation signal IGw is supplied, the energization driver 15 turns on/off the second switch 24 to control the energy supplied from the capacitor 26 to the primary coil 2, thereby controlling the secondary current which is the energization amount of the secondary coil 3. Therefore, the capacitor 26 is charged with a voltage of several hundred volts which is higher than the voltage of the primary coil 2.

The discharge continuation signal IGw is a signal for instructing the period in which the spark discharge generated as main ignition continues.

The second circuit 12 energizes the primary coil 2 in a direction opposite to that by the first circuit 11 during the spark discharge started by the operation of the first circuit 11, to maintain the secondary current in the same direction as that started in the operation of the first circuit 11 and continue supplying energy to the ignition plug 5, thereby allowing the spark discharge to continue.

The circuit between the primary coil 2 and the battery 20 is a return circuit 35 for returning to the battery 20 the current supplied to the primary coil 2 by the operation of the second circuit 12.

Hereinafter, the spark discharge continuing from the main ignition by the operation of the second circuit 12 may also be referred to as continuous spark discharge.

The energization driver 15 receives a current instruction signal IGa which is a signal indicating the instructed value of the secondary current from the ECU 14, and controls the secondary current based on the current instruction signal IGa.

One end of the secondary coil 3 is connected to the center electrode 8 of the ignition plug 5 as described above, and the other end of the secondary coil 3 is connected to a F/B circuit 36 which detects the secondary current generated in the secondary coil 3 and feeds back it to the control unit 13.

The other end of the secondary coil 3 is connected to the F/B circuit 36 via a diode 37 which restricts the direction of the secondary current to one direction. A shunt resistor 38 for detecting the secondary current is connected to the F/B circuit 36.

The energization driver 15 controls the on/off switching of the second switch 24 based on the fed-back detected value of the secondary current and the instruction value of the secondary current determined based on the current instruction signal IGa. That is, for example, the energization driver 15 sets the upper and lower thresholds for the detected value of the secondary current based on the instruction value, and starts or stops outputting a control signal according to the result of comparison between the detected value and the upper and lower thresholds.

More specifically, when the detected value of the secondary current becomes larger than the upper limit, the energization driver 15 stops outputting the control signal, and when the detected value of the secondary current becomes smaller than the lower limit, it starts outputting the control signal.

Next, the normal operation of the ignition device 1 will be described with reference to FIG. 3.

Figure 3:
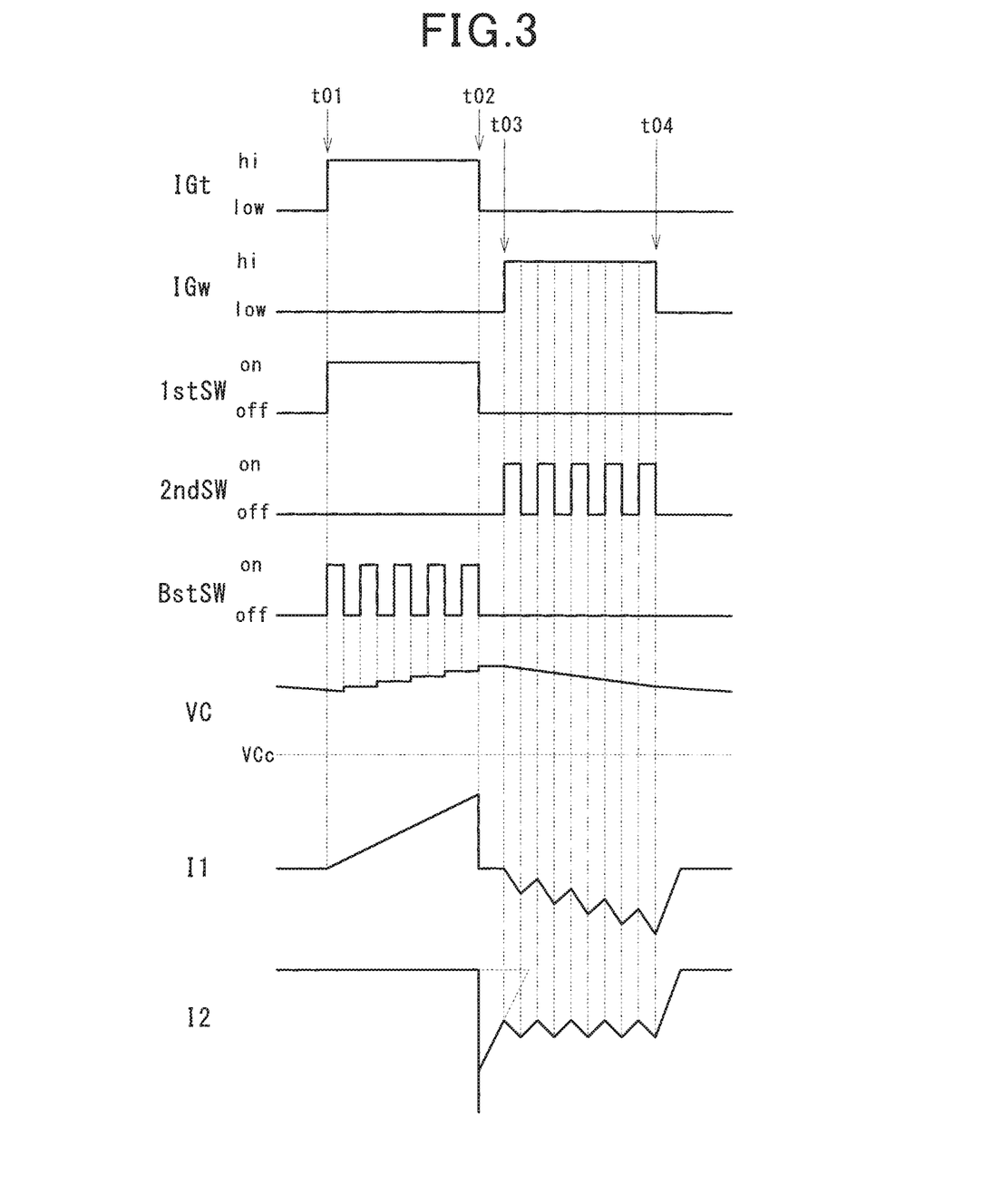
FIG. 3 is a timing diagram showing the operation of the ignition device according to the Example of the present disclosure under normal conditions.

In FIG. 3, "IGt" represents the input state of the ignition signal IGt with high/low, and "IGw" represents the input state of the discharge continuation signal IGw with high/low. "1stSW" represents the on/off state of the first switch 21, "2ndSW" represents the on/off state of the second switch 24, and "BstSW" represents the on/off state of the boost switch 28. "VC" represents the charge voltage of the capacitor 26. Further, "I1" represents the primary current (the current value supplied to the primary coil 2), and "I2" represents the secondary current (the current value supplied to the secondary coil 3).

When the ignition signal IGt switches from low to high (see time t01), while the ignition signal IGt is high, the first switch 21 maintains the on state and a positive primary current flows, and energy is stored in the primary coil 2. When the charging voltage of the capacitor 26 is lower than a certain value, the boost switch 28 repeatedly turns on/off, and boosted energy is stored in the capacitor 26.

When the ignition signal IGt switches from high to low (see time t02), the first switch 21 is turned off, and the energization of the primary coil 2 is interrupted. As a result, a high voltage is generated in the secondary coil 3 by electromagnetic induction, and main ignition occurs at the ignition plug 5.

After the occurrence of main ignition at the ignition plug 5, the secondary current attenuates in a substantially triangular waveform (see the dotted line of I2). Then, before the secondary current reaches the lower threshold, the discharge continuation signal IGw switches from low to high (see time t03).

When the discharge continuation signal IGw switches from low to high, the second switch 24 is on/off controlled, the energy stored in the capacitor 26 is sequentially supplied to the negative side of the primary coil 2, and the primary current flows from the primary coil 2 toward the (+) electrode of the battery 20.

More specifically, every time the second switch 24 is turned on, a primary current flowing from the primary coil 2 toward the (+) electrode of the battery 20 is added, and the primary current increases to the negative side (see time t03 to t04).

Every time a primary current is supplied, a secondary current in the same direction as the secondary current by the main ignition is sequentially added to the secondary coil 3, and the secondary current is maintained between the upper limit and the lower limit.

Thus, by turning on and off the second switch 24, the secondary current continues to flow such that the spark discharge can be maintained. As a result, when the on state of the discharge continuation signal IGw continues, the continuous spark discharge is maintained at the ignition plug 5.

Characteristics of Example

Next, characteristic features of the above Example will be described.

The ignition device 1 further includes a voltage detection unit 40, a charge voltage detection unit 41, an operation stopping unit 42, and a ground circuit 43.

The voltage detection unit 40 is connected to the battery 20 side of the primary coil 2, that is, to the (+) side of the primary coil 2, and detects voltage of the (+) side of the primary coil 2.

Hereinafter, the (+) side of the primary coil 2 may be referred to as the primary coil (+) side and the voltage of the (+) side of the primary coil 2 may be referred to as voltage VB.

The voltage detection unit 40 has resistors 44, 45.

The resistor 44 and the resistor 45 are connected in series, and one end of the resistor 45 is connected to the ground. One end of the resistor 44 is connected to the primary coil (+) side.

The potential between the resistor 44 and the resistor 45 is inputted to the operation stopping unit 42 described later. That is, the voltage detection unit 40 outputs a divided voltage obtained by dividing the voltage VB as the signal of the voltage VB.

The charge voltage detection unit 41 is provided between the capacitor 26 and the second switch 24, and detects the charge voltage of the capacitor 26 (hereinafter, the charge voltage of the capacitor 26 may be referred to as charge voltage VC).

The charge voltage detection unit 41 has resistors 47 and 48.

The resistor 47 and the resistor 48 are connected in series, one end of the resistor 47 is connected to the (+) electrode of the capacitor 26 and one end of the resistor 48 is connected to the ground. That is, the charge voltage detection unit 41 outputs a divided voltage obtained by dividing the charge voltage VC as the signal of the charge voltage VC to the operation stopping unit 42.

The boost driver 29 detects the charge voltage VC based on the divided voltage outputted from the charge voltage detection unit 41, and turns on/off the boost switch 28 at a certain cycle.

The operation stopping unit 42 monitors the voltage VB and determines that there is an abnormality in the return circuit 35 to the battery 20 when it is determined that the voltage VB is excessive, and stops the provision of energy by the second circuit 12.

The operation stopping unit 42 includes a voltage determination unit 50, a charge voltage determination unit 51, and a stop instruction unit 52, which will be described below.

The voltage determination unit 50 monitors the voltage VB based on the output signal of the voltage detection unit 40. It determines whether the voltage VB is excessive, and outputs a high or low signal according to the determination result.

Figure 4A:
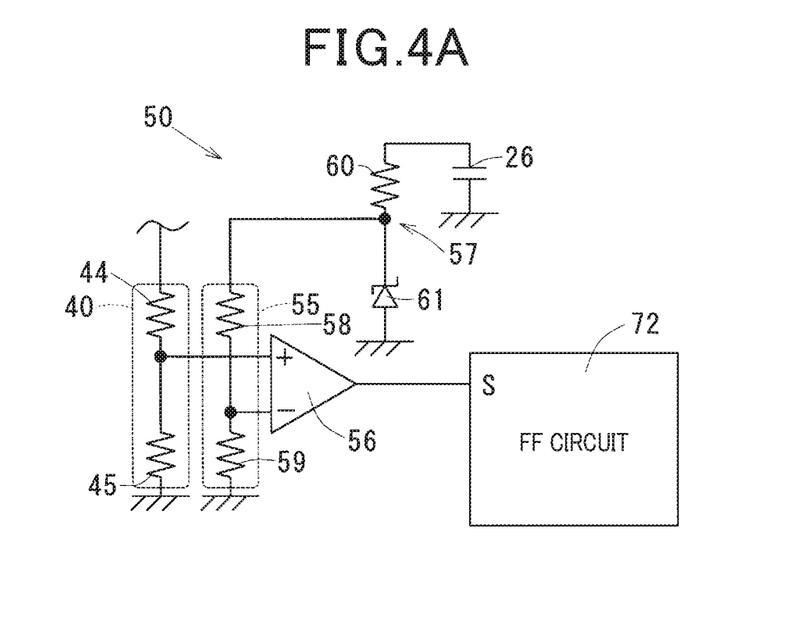
FIG. 4A illustrates a voltage determination unit and a charge voltage determination unit according to the Example of the present disclosure.

The voltage determination unit 50 includes a threshold voltage generation unit 55, a comparator 56, a constant voltage source 57, and so on (see FIG. 4A).

The threshold voltage generation unit 55 generates and outputs a signal of a reference threshold voltage VBc for determining whether the voltage VB is excessive, and is formed of resistors 58 and 59.

The resistor 58 and the resistor 59 are connected in series, one end of the resistor 58 is connected to the constant voltage source 57 and one end of the resistor 59 is connected to the ground. That is, the threshold voltage generation unit 55 divides the voltage of the constant voltage source 57 to output the divided voltage as the output signal of the threshold voltage VBc to the comparator 56.

The comparator 56 compares the voltages inputted to the non-inverting and inverting input terminals, and outputs a high signal when the voltage of the non-inverting input terminal exceeds the voltage of the inverting input terminal, and outputs a low signal when the voltage of the non-inverting input terminal is lower than the voltage of the inverting input terminal. The output signal of the voltage VB from the voltage detection unit 40 is inputted to the non-inverting input terminal of the comparator 56, and the output signal of the threshold voltage VBc from the threshold voltage generation unit 55 is inputted to the inverting input terminal.

The constant voltage source 57 provides a voltage that has been lowered by the resistor 60 connected to the (+) electrode of the capacitor 26 and made constant by the Zener diode 61, and is also a driving source of the comparator 56.

With this configuration, when the voltage VB exceeds the threshold voltage VBc, the voltage determination unit 50 determines that the voltage VB is excessive and outputs a high signal. When the voltage VB is lower than the threshold voltage VBc, it determines that it is not excessive and outputs a low signal.

The threshold voltage VBc is a value that is set based on the magnitude of the surge voltage upon occurrence of load dump. Under normal conditions, the voltage determination unit 50 determines that the voltage VB is not excessive and outputs a low signal.

The charge voltage determination unit 51 monitors the charge voltage VC based on the output signal of the charge voltage detection unit 41. It determines whether the charge voltage VC is lower than the threshold charge voltage VCc, and outputs a high or low signal.

Figure 4B:
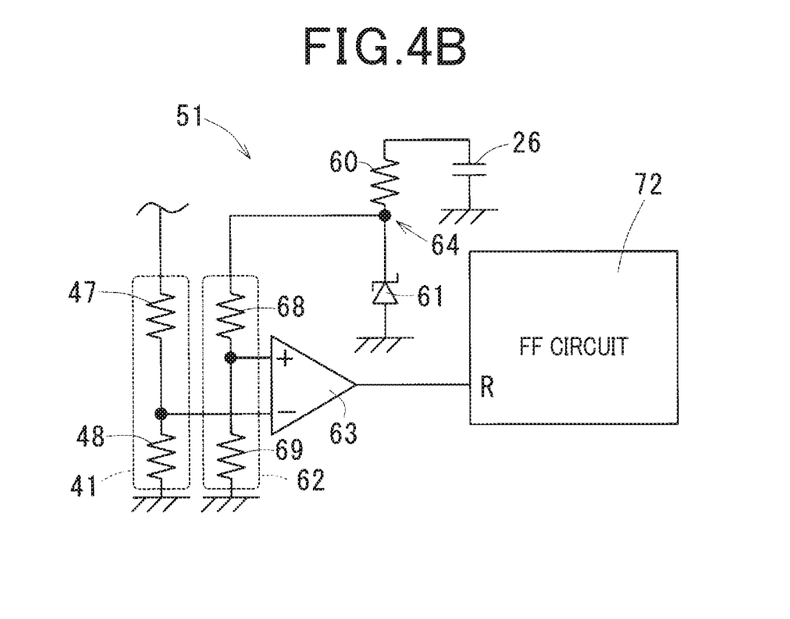
FIG. 4B illustrates a voltage determination unit and a charge voltage determination unit according to the Example of the present disclosure.

For example, the charge voltage determination unit 51 includes a threshold charge voltage generation unit 62, a comparator 63, a constant voltage source 64, and so on (see FIG. 4B).

The threshold charge voltage generation unit 62 generates and outputs a signal of a threshold charge voltage VCc, and is formed of resistors 68 and 69.

The resistor 68 and the resistor 69 are connected in series, one end of the resistor 68 is connected to the constant voltage source 64 and one end of the resistor 69 is connected to the ground. That is, the threshold charge voltage generation unit 62 divides the voltage of the constant voltage source 64 to output the divided voltage as the output signal of the threshold charge voltage VCc to the comparator 63.

The comparator 63 compares the voltages inputted to the non-inverting and inverting input terminals, and outputs a high signal when the voltage of the non-inverting input terminal exceeds the voltage of the inverting input terminal, and outputs a low signal when the voltage of the non-inverting input terminal is lower than the voltage of the inverting input terminal. The output signal of the threshold charge voltage VCc from the threshold charge voltage generation unit 62 is inputted to the non-inverting input terminal of the comparator 63, and the output signal of the charge voltage VC from the charge voltage detection unit 41 is inputted to the inverting input terminal.

The constant voltage source 64 has the same configuration as that of the constant voltage source 57, and also serves as the driving source of the comparator 63.

When the charge voltage VC is lower than the threshold charge voltage VCc, the charge voltage determination unit 51 outputs a high signal. When the charge voltage VC exceeds the threshold charge voltage VCc, it outputs a low signal.

The threshold charge voltage VCc is set to a value that is sufficiently lower than the charge voltage VC under normal conditions. More specifically, the threshold charge voltage VCc is set to be sufficiently smaller than the charge voltage VC after the end of continuous spark discharge until charging of the capacitor is started in preparation for the next main ignition (see before time t01 or after time t04 of the transition of VC in FIG. 3).

The stop instructing unit 52 stops the supply of energy by the second circuit 12 based on the signals inputted from the voltage determination unit 50 and the charge voltage determination unit 51.

More specifically, the stop instruction unit 52 includes, for example, an RS flip-flop circuit (hereinafter referred to as FF circuit 72) and switches 73 and 74, etc.

When the voltage VB is higher than the threshold voltage VBc and the charge voltage VC is higher than the threshold charge voltage VCc, the FF circuit 72 stops the supply of energy by the second circuit 12 and the charging by the boost circuit 23. Even when the voltage VB becomes lower than the threshold voltage VBc thereafter, the supply of energy by the second circuit 12 and the charging by the booster circuit 23 remain stopped.

More specifically, the FF circuit 72 includes an S terminal for receiving a signal from the voltage determination unit 50, an R terminal for receiving a signal from the charge voltage determination unit 51, and a Q terminal for outputting signals to the switches 73 and 74. When the signal inputted from the voltage determination unit 50 is low (VB<VBc) and the signal inputted from the charge voltage determination unit 51 is high (VC<VCc), the FF circuit 72 outputs low signals to the switches 73 and 74. When the signal inputted from the voltage determination unit 50 is high (VB>VBc) and the signal inputted from the charge voltage determination unit 51 is low (VC>VCc), the FF circuit 72 outputs high signals to the switches 73 and 74.

When both of the signals inputted from the voltage determination unit 50 and the charge voltage determination unit 51 are switched to low (VB<VBc, VC>VCc), the signals outputted to the switches 73 and 74 maintain the same states as immediately before switching. For example, when a state where the signal inputted from the voltage determination unit 50 is high and the signal inputted from the charge voltage determination unit 51 is low has changed to a state where both of the signals inputted from the voltage determination unit 50 and the charge voltage determination unit 51 are low, the signals outputted to the switches 73 and 74 stay high.

When the voltage VB is higher than the threshold voltage VBc and the charge voltage VC is higher than the threshold charge voltage VCc, the FF circuit 72 outputs high signals to the switches 73 and 74, and stops the supply of energy by the second circuit 12 and the charging by the boost circuit 23. Even when the voltage VB becomes lower than the threshold voltage VBc thereafter, the FF circuit 72 keeps outputting high signals to the switches 73 and 74, and keeps stopping the supply of energy by the second circuit 12 and the charging by the boost circuit 23.

The switch 73 forcibly turns off the operation state of the second switch 24 regardless of the instruction from the energization driver 15 by its turn-on operation. Specifically, the switch 73 is, for example, a MOS transistor, and the drain is connected to the gate of the second switch 24, the source is connected to the ground, and the output signal of the FF circuit 72 is inputted to the gate. As a result, when a high signal is inputted from the FF circuit 72 to turn on the switch 73, the switch 73 forcibly turns off the operation state of the second switch 24 and stops the supply of energy by the second circuit 12.

The switch 74 forcibly turns off the operation state of the boost switch 28 regardless of the instruction from the boost driver 29 by its turn-on operation. Specifically, the switch 74 is, for example, a MOS transistor, and the drain is connected to the gate of the boost switch 28, the source is connected to the ground, and the output signal of the FF circuit 72 is inputted to the gate. As a result, when a high signal is inputted from the FF circuit 72 to turn on the switch 74, the switch 74 forcibly turns off the operation state of the boost switch 28 and stops the charging by the boost circuit 23.

When the voltage VB becomes higher than the threshold voltage VBc upon occurrence of load dump, the stop instruction unit 52 stops the supply of energy by the second circuit 12. Further, even when the voltage VB becomes lower than the threshold voltage VBc thereafter, the supply of energy by the second circuit 12 remain stopped.

As with the comparators 56 and 63, the FF circuit 72 and the switches 73 and 74 use the energy of the capacitor 26 as their power source so that they can reliably operate even when load dump occurs.

The drive voltage Vth of the entire operation stopping unit 42 is determined from the drive voltages of the FF circuit 72, the switches 73 and 74, the comparators 56 and 63, etc., and the magnitude of the drive voltage Vth is set to be smaller than the threshold charge voltage VCc.

Thus, after the activation of the internal combustion engine, the operation of the operation stopping unit 42 starts when the charge voltage VC reaches the driving voltage Vth. After that, as long as the normal operation continues without occurrence of load dump, the second switch 24 and the boost switch 28 continue normal operation according to instructions from the energization driver 15 and the boost driver 29, respectively.

After starting the internal combustion engine, first, the charge voltage VC reaches the driving voltage Vth, and the operation of the operation stopping unit 42 starts. At this time, since VC<VCc, the signal inputted from the charge voltage determination unit 51 to the FF circuit 72 is high. In addition, since load dump has not occurred, the signal inputted from the voltage determination unit 50 to the FF circuit 72 is low. Therefore, since the FF circuit 72 outputs low signals to the switches 73 and 74, the switches 73 and 74 do not turn on and the second switch 24 and the boost switch 28 operate normally according to the instructions from the energization driver 15 and the boost driver 29, respectively.

Thereafter, when the charging of the capacitor 26 proceeds and becomes VC>VCc, and the signal inputted from the charge voltage determination unit 51 to the FF circuit 72 switches to low, the signals inputted from the voltage determination unit 50 and the charge voltage determination unit 51 become both low. Then, the signal outputted from the FF circuit 72 to the switches 73 and 74 stays low as it was immediately before the switching. Therefore, the switches 73 and 74 still do not turn on and the second switch 24 and the boost switch 28 continue to operate normally according to the instructions from the energization driver 15 and the boost driver 29, respectively.

After the activation of the internal combustion engine, as long as the normal operation continues without occurrence of load dump, the second switch 24 and the boost switch 28 continue normal operation according to the instructions from the energization driver 15 and the boost driver 29, respectively, and the supply of energy by the second circuit 12 and the charging by the boost circuit 23 are repeated.

The ground circuit 43 connects the primary coil (+) side to the ground.

The ground circuit 43 includes a Zener diode 75.

More specifically, the anode side of the Zener diode 75 is connected to the primary coil (+) side, and the cathode side is connected to the ground.

Operation of Example

Figure 5:
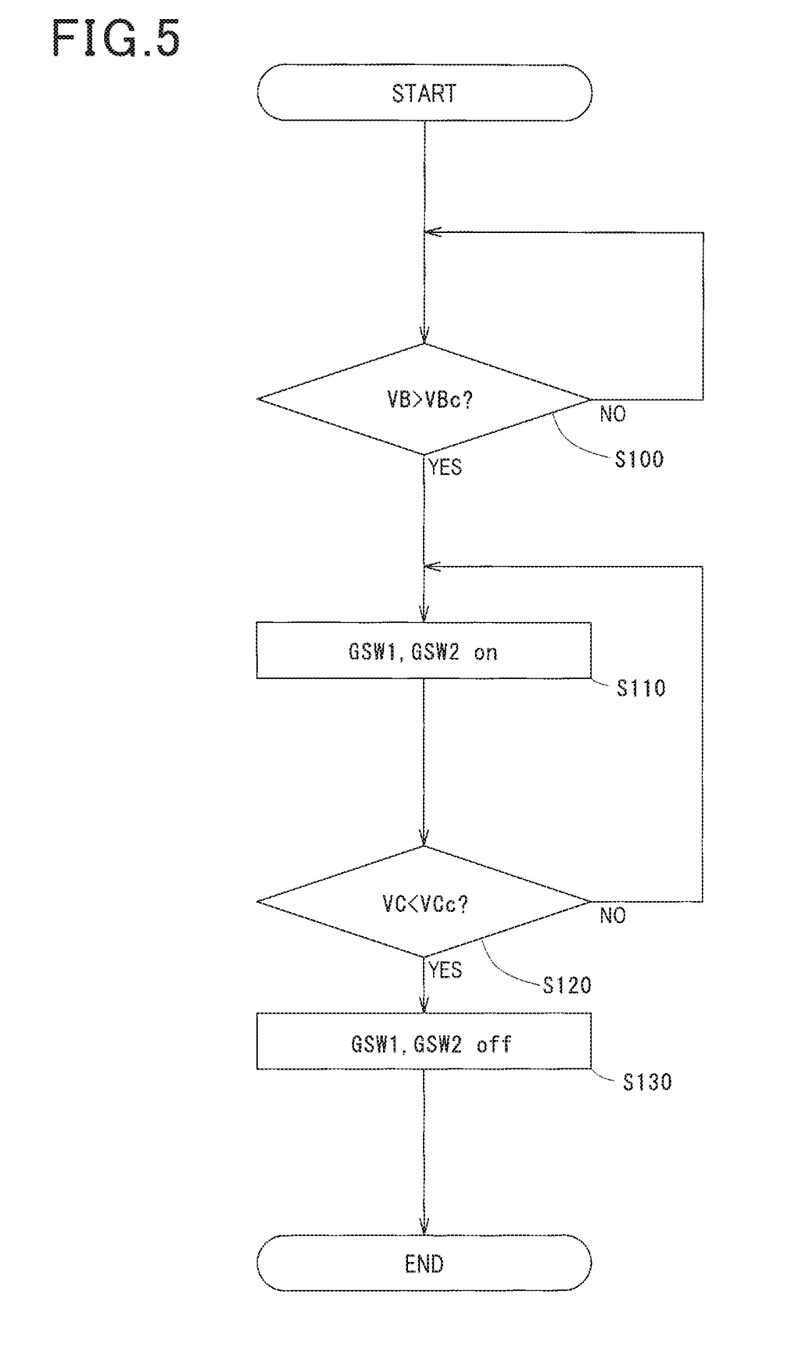
FIG. 5 is a flowchart illustrating the operation of the ignition device according to the Example of the present disclosure when load dump occurs.

The operation of the Example upon occurrence of load dump will be described with reference to FIGS. 5 and 6.

In the following description, it is assumed that load dump has occurred at time t05 shown in FIG. 6.

Figure 6:
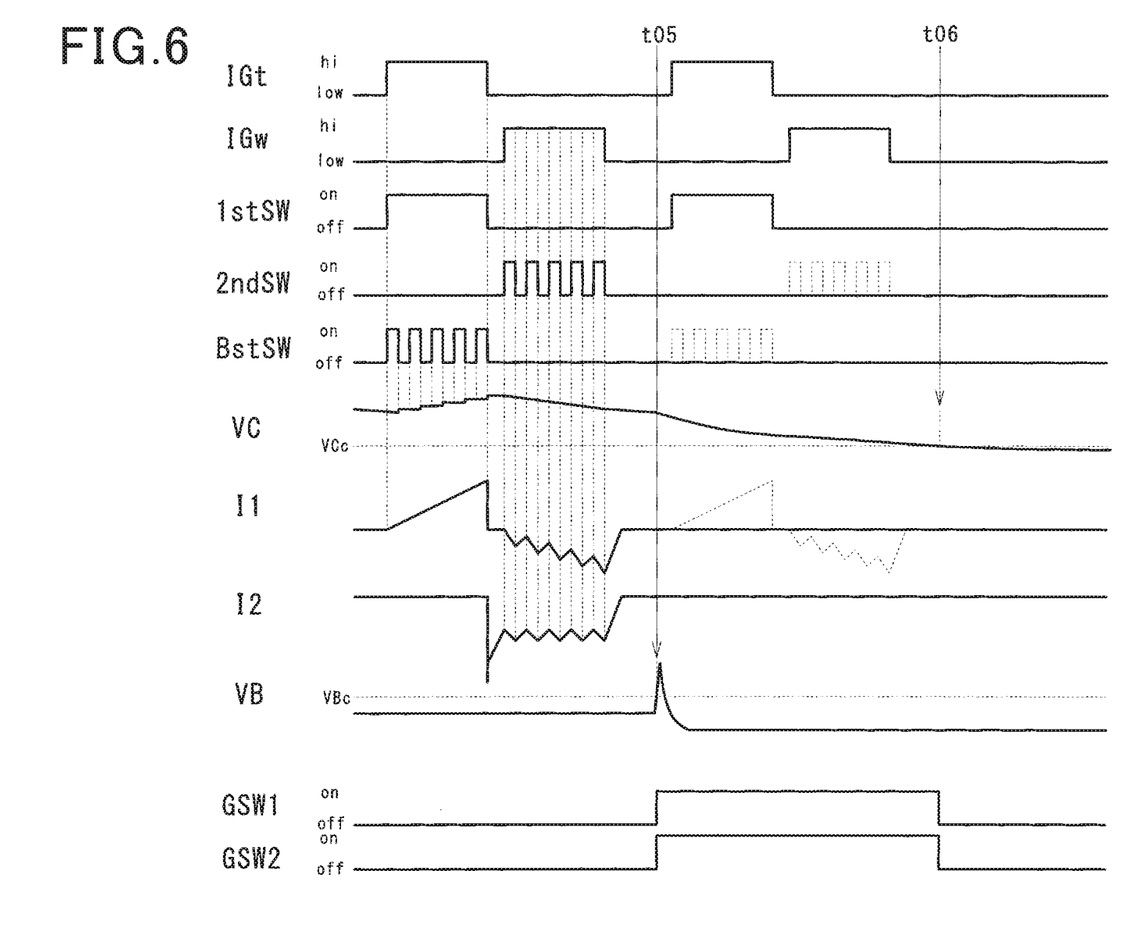
FIG. 6 is a timing diagram illustrating the operation of the ignition device according to the Example of the present disclosure when load dump occurs.

In FIG. 6, "VB" represents the voltage VB. "GSW1" represents the on/off state of the switch 73. "GSW2" represents the on/off state of the switch 74.

First, at step S100, the voltage determination unit 50 determines whether the voltage VB exceeds the threshold voltage VBc.

When it is determined that the voltage VB exceeds the threshold voltage VBc (YES: see time t05 in FIG. 6), the process proceeds to step S110. When it is determined that the voltage VB does not exceed the threshold voltage VBc (NO), the determination at step S100 is repeated.

Upon occurrence of load dump (see time t05 in FIG. 6), the voltage VB increases instantaneously and decreases immediately. Thus, the signal inputted from the voltage determination unit 50 to the FF circuit 72 changes from low to high once, and then immediately switches to low.

Even if load dump occurs and the battery 20 is disconnected, the ECU 14 receives power supplied from the alternator 22 or the like so it cannot stop immediately and continues controlling devices for a while (see, for example, IGt from time t05 to time t06 in FIG. 6).

Next, at step S110, the operation stopping unit 42 turns on the switches 73 and 74.

As the switches 73 and 74 are turned on (see GSW1 and GSW2 from time t05 to time t06 in FIG. 6), the second switch 24 and the boost switch 28 are forcibly turned off (see 2ndSW dotted line, BstSW dotted line from time t05 to time t06 in FIG. 6). Thus, no current flows through the primary coil 2 (see the I1 dotted line from time t05 to time t06 in FIG. 6).

Next, at step S120, the charge voltage determination unit 51 determines whether the charge voltage VC is below the threshold charge voltage VCc.

When it is determined that the charge voltage VC is below the threshold charge voltage VCc (YES: see time t06 in FIG. 6), the process proceeds to step S130.

On the other hand, when it is determined that the charge voltage VC is not below the threshold charge voltage VCc (NO), the process proceeds to step S110 and the switches 73 and 74 stay on.

Next, at step S130, the switches 73 and 74 are turned off (see time t06 in FIG. 6), and the flow ends.

When the switches 73 and 74 are turned off, it is possible that the second switch 24 and the boost switch 28 turn on. However, since the threshold charge voltage VCc is set sufficiently low, even if the second switch 24 turns on, it has little influence on other devices, etc.

Effects of Example

According to the ignition device 1 of the Example, the return circuit 35 returns to the battery 20 the current supplied to the primary coil 2 by the operation of the second circuit 12, and the voltage detection unit 40 detects the voltage VB. The operation stopping unit 42 monitors the voltage VB and when it is determined that the voltage VB is excessive, that is, when the voltage VB exceeds the threshold voltage VBc, it stops the supply of energy by the second circuit 12.

As a result, in case the so-called load dump state occurs when the connection to the battery 20 breaks, the supply of energy by the second circuit 12 can be stopped. Thus, when a load dump state occurs in an ignition device which employs a battery 20 as a destination of the return flow of the current supplied to a primary coil 2 by the operation of a second circuit 12, other devices can be protected from overvoltage.

The ignition device 1 of the Example includes a boost circuit 23 which boosts the voltage of the battery 20 to store it in the capacitor 26. The second circuit 12 maintains the energization of the secondary coil 3 by the energy stored in the capacitor 26 and continues supplying energy to the ignition plug 5. The operation stopping unit 42 uses the energy stored in the capacitor 26 as its power source.

Thus, even when a load dump state occurs, the operation stopping unit 42 can operate with the energy stored in the capacitor 26.

Therefore, the operation stopping unit 42 can stop the supply of energy by the second circuit 12. In addition, since the capacitor 26 is used as the power source, even when the supply of energy cannot be stopped by the operation stopping unit 42, since the voltage of the capacitor 26 will be sufficiently low, influence on other devices can be avoided.

According to the ignition device 1 of the Example, when it is determined that the voltage VB is excessive, the operation stopping unit 42 stops boosting by the boosting switch 28.

As a result, unnecessary charging/discharging operation of the capacitor 26 can be prevented upon occurrence of a load dump state.

According to the ignition device 1 of the Example, the operation stopping unit 42 includes the charge voltage detection unit 41 for detecting the charge voltage VC of the capacitor 26. The charge voltage VC is monitored, and while the charge voltage VC is higher than a certain value, the supply of energy by the second circuit 12 is stopped.

Therefore, in a period during which the charge voltage VC is excessive, the operation stopping unit 42 can stop the supply of energy by the second circuit 12. This makes it possible to protect other devices from overvoltage.

The ignition device 1 of the Example includes a ground circuit 43 for connecting the primary coil (+) side to the ground, and the ground circuit 43 is provided with a Zener diode 75.

Thus, when a load dump condition occurs, its own control circuit is protected, and even if energy is supplied by the second circuit 12 due to, for example, a failure in the switches 73 and 74, the voltage value of the overvoltage applied to other devices can be reduced.

REFERENCE SIGNS LIST

1 Ignition device, 2 Primary coil, 3 Secondary coil, 4 Ignition coil, 5 Ignition plug, 11 First circuit, 12 Second circuit, 13 Control unit, 14 ECU, 15 Energization driver, 20 Battery, 23 Boost circuit, 35 Return circuit, 40 Voltage detection unit, 42 Operation stopping unit

The invention claimed is:

1. An ignition device for an internal combustion engine comprising an ignition coil including a primary coil and a secondary coil, and an ignition plug connected to the secondary coil, the ignition device being configured to supply energy to the ignition plug by electromagnetic induction caused by turning on/off the energization of the primary coil so as to cause spark discharge, the ignition device further comprising:

a first circuit that causes the ignition plug to start spark discharge by turning on/off the energization of the primary coil;

a second circuit that energizes the primary coil in a direction opposite to that by the first circuit during the spark discharge started by the operation of the first circuit, to maintain the energization of the secondary coil in the same direction as that started in the operation of the first circuit and continue supplying energy to the ignition plug, thereby allowing the spark discharge to continue;

a control unit that controls the operation of the first circuit and the second circuit;

a return circuit that returns to a battery a current supplied to the primary coil by the operation of the second circuit;

a voltage detection unit that is connected to the battery side of the primary coil and detects a voltage of the battery side of the primary coil; and an operation stopping unit that monitors a voltage of the battery side, and when it is determined that the voltage of the battery side is excessive, stops the supply of energy by the second circuit.

2. The ignition device according to claim 1, further comprising a boost circuit that boosts a voltage of the battery to be stored in a capacitor, wherein the second circuit maintains the energization of the secondary coil by energy stored in the capacitor and continues supplying energy to the ignition plug, and the operation stopping unit uses the energy stored in the capacitor as a power source.

3. The ignition device according to claim 2, wherein, when it is determined that the voltage of the battery side of the primary coil is excessive, the operation stopping unit stops boosting by the boost circuit.

4. The ignition device according to claim 2, wherein the operation stopping unit includes a charge voltage detection unit that detects a charge voltage of the capacitor to monitor the charge voltage, and while the charge voltage is higher than a certain value, the supply of energy by the second circuit is stopped.

5. The ignition device according to claim 1, further comprising a ground circuit that connects the battery side of the primary coil to the ground, wherein the ground circuit comprises a Zener diode.

* * * * *